(12) United States Patent
Joosten et al.

(10) Patent No.: US 7,565,554 B2
(45) Date of Patent: Jul. 21, 2009

(54) METHOD AND SYSTEM FOR A SERVICE PROCESS TO PROVIDE A SERVICE TO A CLIENT

(75) Inventors: Hendrikus Johannes Joosten, Roden (NL); Derk Hiddo Hut, Groningen (NL); Geert Kleinhuis, Eernewoude (NL); René van Buuren, Enschede (NL)

(73) Assignee: Nederlandse Organisatie Voor Toegepast-Natuurwetenschappelijk Onderzoek Tno, Delft (NL)

( * ) Notice: Subject to any disclaimer, the term of this patent is extended or adjusted under 35 U.S.C. 154(b) by 900 days.

(21) Appl. No.: 10/483,374

(22) PCT Filed: Jun. 27, 2002

(86) PCT No.: PCT/EP02/07261

§ 371 (c)(1),
(2), (4) Date: Jun. 2, 2004

(87) PCT Pub. No.: WO03/007571

PCT Pub. Date: Jan. 23, 2003

(65) Prior Publication Data

US 2004/0221045 A1    Nov. 4, 2004

(30) Foreign Application Priority Data

Jul. 9, 2001   (NL) .................................... 1018494

(51) Int. Cl.
*G06F 11/30*   (2006.01)
*G06F 12/14*   (2006.01)

(52) U.S. Cl. ....................................... 713/193; 380/278

(58) Field of Classification Search ................ 235/375; 380/278; 705/44; 709/225; 713/169, 184, 713/193, 201
See application file for complete search history.

(56) References Cited

U.S. PATENT DOCUMENTS 5,280,527 A * 1/1994 Gullman et al. ............. 713/184

(Continued)

FOREIGN PATENT DOCUMENTS

WO    WO 99-00958    1/1999

(Continued)

OTHER PUBLICATIONS

Adrian Perrig, Efficient and Secure Source Authentication for Multicast, Dec. 31, 2001, IBM Research, 1-12.*

(Continued)

*Primary Examiner*—Andrew L Nalven
*Assistant Examiner*—Monjour Rahim
(74) *Attorney, Agent, or Firm*—Michaelson & Associates; Peter L. Michaelson

(57) ABSTRACT

Method and system for a service server to provide a service to a client. The client (C) sets up a secure session to an authentication server (CAP) and sends its identifier and a service request stating the required service. The authentication server verifies the client identifier and sends the service request to a service authorization server (DAP). The authorization server checks whether the required service may be provided and sends the authorized service request to the authentication server. The authentication server generates a token, associated with the authorized service request. Via the secure session, the authentication server sends the address of the relevant service server and the token. The client sends the token to the service server, which then sends the token to the authentication server. The authentication server fetches the service request associated with the token and forwards it to the service server, after which the service server gives the client the required service.

4 Claims, 2 Drawing Sheets

U.S. PATENT DOCUMENTS

| | | | |
|---|---|---|---|
| 6,212,635 B1* | 4/2001 | Reardon | 713/165 |
| 6,253,322 B1* | 6/2001 | Susaki et al. | 713/170 |
| 6,393,411 B1* | 5/2002 | Bishop et al. | 705/44 |
| 2001/0027527 A1* | 10/2001 | Khidekel et al. | 713/201 |
| 2001/0045451 A1* | 11/2001 | Tan et al. | 235/375 |
| 2002/0031230 A1* | 3/2002 | Sweet et al. | 380/278 |
| 2002/0078352 A1* | 6/2002 | Angwin et al. | 713/169 |
| 2002/0129261 A1* | 9/2002 | Cromer et al. | 713/193 |
| 2008/0021997 A1* | 1/2008 | Hinton | 709/225 |

FOREIGN PATENT DOCUMENTS

| | | |
|---|---|---|
| WO | WO 99-22317 | 5/1999 |
| WO | WO 00/69110 | 11/2000 |
| WO | WO 01/11845 | 2/2001 |
| WO | WO 01/27709 | 4/2001 |

OTHER PUBLICATIONS

V., Samar, "Single Sign-On Using Cookies for Web Applications", Enabling Technologies: Infrastructure for Collaborative Enterprises, 1999 Proceedings, IEEE 8th International Workshops on Stanford, CA, Jun. 16-18, 1999, Los Alamitos, CA IEEE Computer Society, Jun. 16, 1999, pp. 158-163.

* cited by examiner

METHOD AND SYSTEM FOR A SERVICE PROCESS TO PROVIDE A SERVICE TO A CLIENT

CLAIM TO FOREIGN PRIORITY

This application is a US national entry counterpart of and claims the benefit under 35 USC § 119 of international application PCT/EP02/07261 published as International application WO 03/007571, filed Jun. 27, 2002. That PCT application claims priority, as do the Applicants here, of Dutch patent application serial number 1018494 filed Jul. 9, 2001.

BACKGROUND OF THE INVENTION

1. Field of the Invention

The invention pertains to a method, or system, for a service process to provide a service to a client. The field of the invention is the delivery of services via computer networks.

2. Description of the Prior Art

Authentication and authorization of clients by servers pose a problem that has in theory been "solved", but in practice it is a persistent problem full of pitfalls. The practical result is that the secure (i.e., authenticated and authorized) provision of service occurs hardly at all on the Internet, and that users have little confidence in existing services.

Numerous causes are identifiable for this situation, including:

when a service uses the SSL protocol to authenticate the customer and to make the service provisioning secure, SSL must be capable of transporting ("tunneling") the service provisioning protocol. This is not possible with protocols based on UDP. Simple UDP-based protocols are DNS (Domain Name Service), TFTP (Trivial File Transfer Protocol), SNMP (Simple Network Management Protocol), Syslog protocol, etc. More complex examples include video and audio streaming (such as RealAudio and RealVideo), multi-user gaming protocols and similar;

when a service uses IPSEC, the following problem arises. IPSEC sets up a secure connection ("transport pipe") between two machines (computers, routers or combinations thereof), one that is separate from the services (client/servers) that use it. Several services may use the same IPSEG pipe. Use of the IPSEC authentication as an authentication for the service is similar to a person accepting the authenticity of the sender of a postcard because the postman is able to identify himself with means of identification. Apart from this, IPSEC is a far more difficult protocol than SSL to operate, both technically and from the point of view of security;

when use is made of a combination of IPSEC and SSL for the above-mentioned purposes, the transmitted data is encrypted twice (once by IPSEC, once by SSL), which drastically reduces the speed of transport, and makes it more difficult to put the connection into operation. This quickly becomes unacceptable, particularly for real-time data transport (multimedia services);

to the extent that authentication and authorization do take place, they are usually interwoven with an existing service, which causes greater problems as the service itself becomes larger and more complex.

SUMMARY OF THE INVENTION

The invention aims to make it possible to:

1) modify in a simple way existing services that do little or no authentication/authorization, in such a way that they then possess robust authentication/authorization;

2) develop new services whereby the authentication/authorization part is separated from the actual service provisioning part.

The invention comprises reusable components for implementing authentication and authorization. The invention solves the aforementioned problems by separating responsibilities from processes. A protocol will be defined that indicates how these parts communicate with each other in a way such that a service provider can provide his service to an authenticated and authorized customer.

In a preferred embodiment of the invention, four processes are distinguishable, i.e.:

a client process, for example a standard browser such as Microsoft Internet Explorer, hereafter also referred to as "client". This process is situated in the security domain of the service user;

an authentication process, situated in the security domain of either the service provider or a trusted third party;

a service authorization process (DAP). This process—the actual authorization process where it is determined whether a certain service can or cannot be provided to a certain client—is situated in the security domain of the service provider;

a service process (DP), situated in the security domain of the service provider.

According to the invention, a subset (at least one) of the processes may also be used. The method according to the invention consists of at least one of the following steps:

a. the client sets up a secure session—an SSL session, for example—to the authentication process and—sends a client identifier—an X.509 public key certificate, for example—and a service request indicating which service is required;

b. the authentication process verifies the client identifier and sends to the authorization process the verified client identifier, preferably with a "degree of certainty" indication regarding the authenticity of the client identifier, and the service request; this allows the authorization process to know (1) which service is being requested, (2) by whom and (3) it has (preferably) a certain degree of certainty (indicated, for example, by Class I, II or III certificates) regarding the identity of client;

c. the authorization process checks whether the service indicated in the service request can and may be provided to the client, and sends back to the authentication process the result of the check in the form of an authorized service request, together with a certain period of validity; the authorized service request represents authorization to start, within the period of validity, providing the service to the client;

d. the authentication process generates a token and associates it with the authorization issued in the previous step (the authorized service request);

e. the authentication process then sends to the client the address of the service process concerned and the token, for example by means of an HTML page that contains that address and token as a hyperlink, whereby the browser of the client will be redirected to the (hyperlink) address of the service process;

f. the client contacts the service process (by means of the hyperlink) and sends the token received from the authentication process (the session between the client and the verification process can be terminated) to the service process;

g. the service process sends the token received from the client to the authentication process;

h. the authentication process fetches the authorized service request ("authorization") associated with the token, checks whether the period of validity is good and then sends the authorized service request to the service process. Note that this situation is exactly the same as if no authentication and authorization had taken place and the client process had sent the service request directly to the service process. This is because the client process started the session between the client and the service process, and the protocol used is the same protocol that the service process would have used in other cases for this purpose;

i. the service process then provides the service required by the client.

The system according to the invention comprises the means for executing the above-mentioned steps in the method. The described invention has the following advantages:

1) the invention uses standard protocols;

2) the invention needs to be implemented only on the server side (i.e., where the authentication process, authorization process and service process have been activated). Popular browsers (such as Microsoft Internet Explorer, Netscape Navigator and similar) are usable without any modifications on the client side;

3) no extra support (such as a helpdesk) is needed for end-users;

4) with minimal modifications, any electronic service that does not (yet) carry out authentication/authorization can use the invention, regardless of the protocol that the service uses;

5) the invention does not use sessions set up by a server and, by consequence, (a) requires no special modifications to firewalls, and (b) is also usable if the client is situated in a network connected to the Internet via Network Address Translation (NAT);

6) the invention allows simple separation of business processes and operational processes, while the interfaces between the different processes are also very simple. This makes it easy to avoid a situation where a service is created as an inflexible monolithic entity.

REFERENCES

SSL (ftp://ds.internic.net/internet-drafts/draft-freier-ssl-version3-02.txt). This is an Internet draft dated 18 Nov. 1996. The SSLv3 protocol has not been formally standardized but is the de facto standard. The protocol offers privacy and reliability between two communicating applications (processes). It allows client/server applications to communicate in a manner designed to prevent third parties from being able to eavesdrop on communication, alter messages or add messages. In the protocol stack, SSL expects a reliable transport protocol (like TCP, but not UDP, for example) below it.

IPSEC (http://www.ietf.org/rfc/rfc2401.txt). The purpose of IPSEC is to offer various security services for traffic on the IP layer, both in IPv4 and IPv6 environments. Although IPSEC can form part of service security, it is unable to make an entire service secure, because IPSEC operates at IP level, and it must be possible to guarantee the security of services also at higher levels;

closed systems also exist for authentication/authorization. See, for example, RABO Bank for electronic banking, the EasyPay system of Shell, Digital Postal Stamps of PTT Post and similar. Systems of this kind have the disadvantage that the customer needs additional hardware before being able to use the services.

DETAILED DESCRIPTION

Figure 1:
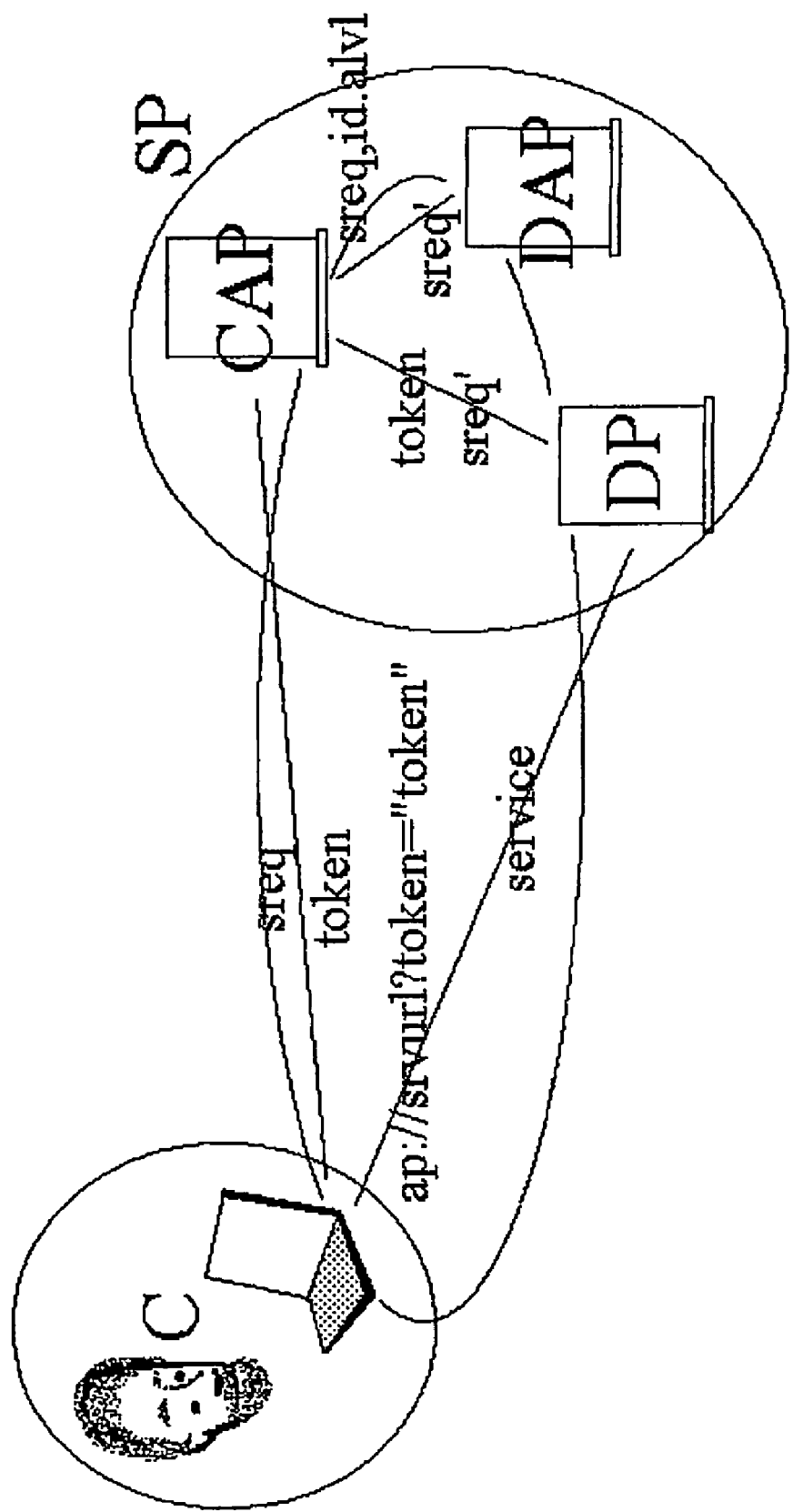
FIG. 1 depicts, in block diagram form, an implementation of the present invention.

FIG. 1 shows an implementation of the invention, representing a system with four processes, i.e., four hardware/software modules (computers, servers, terminals, etc.) on which those processes run and can contact each other via a network (such as the Internet).

FIG. 1 shows a client process (C), implemented by means of a web browser like Microsoft Internet Explorer on a user's PC, a Client Authentication Process (CAP), implemented by means of procedures from standard libraries, a Service Authorization Process (DAP) and a Service Process (DP) that can provide a service requested by the user by means of his/her client (C).

Each process falls within one security domain, i.e., one person or authority manages the process and bears the consequences of what the process does or does not do. Process C, for example, falls under the security domain of the user, while CAP falls under the security domain of the service provider (SP) concerned or a trusted third party, while the DAP and DP fall under the security domain of the service provider.

In this context, a "protocol" is understood to be a method for allowing two (computer) processes to communicate with each other. These may be Internet protocols, for example, but also procedure calls (if the processes run on the same machine), or other protocols.

The shown implementation of the invention uses the following communication protocols:

SSL (Secure Sockets Layer Protocol) or TLS (Transport Layer Security protocol). These are well-know and well-documented protocols (see references);

DSP (Domain Secure Protocol). This is not an existing protocol, but a "place holder" name for any protocol that either (1) provides communication between two processes within one and the same security domain, and (2) has been designated by the administrator of that security domain as "safe" for use within that security domain, or (1) provides communication between a process in the security domain of a TTP and a process in the security domain of the service provider concerned, and (2) has been designated by the administrators of these security domains as "safe" for use within those security domains;

DSP1, a DSP protocol used between the CAP and DAP processes;

DSP2, a DSP protocol used between the CAP and DP processes.

AP (Application Protocol). This is not an existing protocol, but a "place holder" name for the protocol between the client process (C) and the service process (DP). This protocol must satisfy the security requirements (and other requirements) laid down by the service provider for the protocol.

The Procedure is as Follows:

a connection is set up between process C and CAP. This connection uses the SSL or TLS protocol. The protocol is set in such a way that during the set-up of this connection:

(a) C authenticates the CAP based on a server certificate to be sent by the CAP that has been issued by a party known to C ("Trusted Third Party");

(b) CAP sends to C a list of client certificate issuers accepted by CAP. For each certificate type and issuer, the CAP further has the degree of certainty applied by the service provider for authentication of certificates of that type and issuer.

CAP initiates a connection between CAP and DAP, using the DSP 1 protocol (see above).

C initiates a connection between C and DP, using the AP protocol (see above).

a connection is set up between service process DP and the CAP. This process uses the DSP2 protocol (see above). DP or CAP can set up this connection. The invention assumes the existence of an (electronic) "contract" between users and service providers, specifying which services the DP may provide to the user and on what conditions. These conditions may possibly impose requirements regarding the type of certificate a client may submit for authentication, parameters that can influence the service, the charge the service provider requires from C for providing the required service, etc. The aforementioned service requests consist of a set of service parameters and take the form of a parameter list that may be added to a URL. Where reference is made to "authorization", this term comprises (1) the identity of the user (via the client C) for whom the authorization is intended, (2) a service request for which the authorization was issued, (3) a validity interval (i.e., a time interval within which the authorization is valid), and (4) an IP address from where the authorization was requested. The service request takes the form of a parameter list added to a URL. The authorization further possesses the characteristic that the service provider (SP) has a sufficient degree of certainty that a client for whom the authorization was created is capable of obtaining access to the service within the validity interval.

The "token" referred to above consists of a row of bits that the CAP creates based on an authorization, in such a way that the token possesses the following characteristics:

(a) CAP can reproduce the authorization (which resulted in the creation of the token) on the basis of the token, at least during the time interval within which the authorization is valid;

(b) the token is valid for such time as the authorization is valid;

(c) the risk of a third party being able to guess a valid token is so small as to be negligible (for example, less than $2^{-50}$);

(d) two or more different (valid) authorizations are not simultaneously associated with one and the same token. As CAP creates and also interprets the token, CAP is able to decide the data included in the token. The token size is limited (not in theory, but probably in practice) by:

the size of the URL of the DP;

the character set (ASCII) permissible for the token; and the maximum length of the URL permitted by the client browser.

The secure hash (or part thereof) of an authorization converted to ASCII could be a good token.

Figure 2:
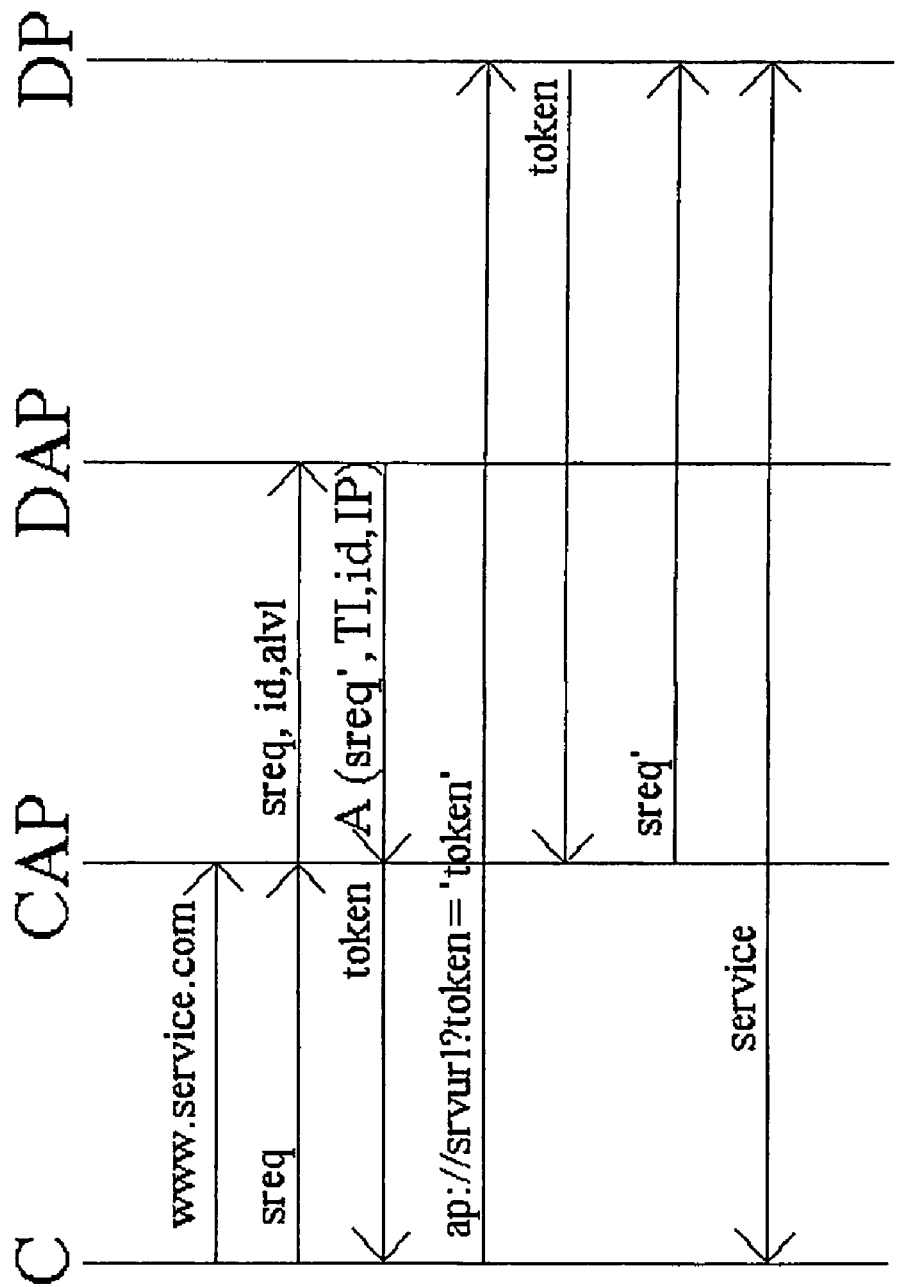
FIG. 2 depicts basic communication flow, in terms of a protocol diagram, among various components shown in FIG. 1 during operation of the present invention.

The diagram in FIG. 2 illustrates how the presented system works:

[1] the user surfs to the required service by entering the address (URL) (for example, www.service.com) in the browser (client), which causes browser C to set up an SSL connection to the CAP server concerned, whereby the client C and the CAP server authenticate each other (see above under "setting up an SSL/TLS connection"). As a result of this action, CAP has at its disposal the identity of the user C(ID), the public key certificate of C against which the ID was checked, Alvl (being a parameter indicating to what extent service provider trusts this check), and the IP address (IP) from where C set up the connection;

[2] C sends a service request sreq to CAP (via the SSL connection just set up);

[3] CAP sends the sreq, ID, Alvl and IP to the DAP process (using the DSP1 protocol);

[4] if DAP determines that the user C is not entitled to the service required by C (for example, because the required service provisioning is not defined by a contract), the protocol will end. If DAP determines that there is an entitlement to the service, DAP will set an alternative service request that (a) is covered by a contract and (b) resembles sreq as closely as possible. DAP further determines a time interval TI (validity interval) within which service provisioning must start;

[5] DAP sends authorization A (consisting of sreq', TI, ID and IP) to CAP (using the DSP1 protocol);

[6] CAP creates a token based on the authorization (A) provided by DAP, with all the properties of a token (see above);

[7] CAP sends (in the already established SSL session) an HTML page to the client, containing a hyperlink to the server DP, such hyperlink including the token as a parameter, with everything occurring in a way such that the browser switches to this hyperlink after a waiting time of zero seconds. This action terminates the SSL session between C and CAP (the invented protocol does not yet terminate);

[8] by interpreting this HTML page, the client browser sets up a session to the server DP according to the CAP protocol specified in the hyperlink. Also, the token is sent to DP by means of this protocol;

[9] DP sends the token to CAP, as well as the IP address (IP) of the client that started the session (using the DSP 2 protocol);

[10] CAP checks whether a valid authorization accompanies the token. If that is not the case, the protocol will terminate. Also, CAP will find out whether:

IP is the same as the IP address (IP) stated in the authorization;

the current time falls within time interval TI stated in the authorization. If either of these items is incorrect, the protocol terminates.

[11] CAP sends to DP the service request (sreq) stated in the authorization (using the DSP2 protocol);

[12] DP now starts providing service to C in accordance with the service request, using the AP protocol, and simultaneously the invented protocol ends.

The following comments need to be made:

1. if a process is situated in the security domain of a legal person, it means that the legal person is responsible for the security aspects of the process (i.e., he manages the security of this process and bears the consequences of what the process does or does not do—unintentionally or otherwise—with regard to security);

2. the "degree of certainty" Alvl indicates how much trust the business has in the statement that "the customer is called ID". After all, this trust may depend on the degree to which the certificate issuer checked the identity, and this circumstance is different in the case of, for example, Class I, II and III certificates;

3. although the standard refers to certificate issuers, the situation in practice is that one certificate issuer may issue several types of certificates (for example, Class I, II and III certificates), whereby the conditions on which a certificate type is issued differ from those attached to a different type of certificate. Consequently, the trust that a service provider has in different certificate types may differ, and every certificate type should have a "degree of certainty" Alvl. However, the "distinguished name" of the issuer as it occurs in the certificate is also used to indicate these certificate types. Therefore, it is possible to suffice in this instance with sending a list of certificate issuers.

The invention claimed is:

1. A method, for use in conjunction with a service process for securely providing a requested service, from a service provider, to a client device and for a service user, the method comprising the steps of:
   a. establishing, by the client device and through a client process situated in a security domain of the service user, a secure session with an authentication process, and sending, to the authentication process, a client identifier and a service request, the service request specifying the service which is then requested by the client device for the service user, the authentication process being situated in a security domain of either the service provider or a trusted third-party;
   b. verifying, through the authentication process, the client identifier so as to yield a verified client identifier, and sending, to an authorization process, the verified client identifier and the service request, the authorization process being situated in the security domain of the service provider;
   c. checking, through the authorization process, whether the service specified in the service request can be provided to the client device, and, if the service can be provided, a result of the check to the authentication process in the form of an authorized service request that includes a validity period, the validity period signifying a time period during which the authorized service request remains valid;
   d. generating, through the authentication process, a token that is associated with the authorized service request;
   e. sending, via the secure session and by the authentication process, to the client device the token and an address of the service process through which the requested service can be obtained, the service process being situated in a security domain of the service provider;
   f. contacting, by the client device, the service process and sending the token to the service process;
   g. sending, by the service process, the token to the authentication process;
   h. fetching, by the authentication process, the authorized service request associated with the token, checking, based on the validity period, whether the authorized service request is currently valid, and, if the authorized service request is currently valid, sending the authorized service request to the service process; and
   i. providing, via the service process, the service then requested by the client device for the service user.

2. THE method recited claim 1 wherein the checking and sending steps (c) comprise the step of also sending, to the authorization process, a "degree of certainty" indication which reflects authenticity of the client identifier.

3. A system for providing a requested service, from a service provider, to a client device and for a service user, the system comprising:
   the client device comprising means for setting up a secure session to an authentication server and for sending, to the authentication server, a client identifier and a service request, the service request specifying the service which is then requested by the client device for the service user, the authentication server being situated in a security domain of either the service provider or a trusted third-party;
   the authentication server comprising means for verifying the client identifier so as to yield a verified client identifier and for sending the verified client identifier and the service request to an authorization server, the authorization server being situated in the security domain of the service provider;
   the authorization server comprising:
      means for performing a check as to whether the service stated in the service request can be provided to the client device; and
      means for sending, to the authentication server, a result of the check in the form of an authorized service request that includes a validity period determined by the authorization server, the validity period signifying a time period during which the authorized service request remains valid;
   the authentication server further comprising:
      means for generating a token associated with the authorized service request; and
      means for sending to the client device, via the secure session, the token and an address of the service server, the service server being situated in a security domain of the service provider;
   the client device further comprising means for sending the token to the service server;
   the service server comprising means for sending to the authentication server the token received from the client device;
   the authentication server further comprising means for fetching the authorized service request associated with the token, checking, based on the validity period, whether the authorized service request is currently valid, and, if the authorized service request is currently valid, sending the authorized service request to the service server; and
   the service server comprising means for subsequently providing the service then requested to the client device for the service user.

4. The system recited in claim 3 wherein the authentication server further comprises means for calculating a "degree of certainty" indication which reflects authenticity of the client identifier and sending the "degree of certainty" indication to the authorization server.

* * * * *